US009669435B2

(12) United States Patent
Kobayashi

(10) Patent No.: US 9,669,435 B2
(45) Date of Patent: Jun. 6, 2017

(54) METAL CONTAINER WASHING APPARATUS

(71) Applicants: THERMOS L.L.C., Schaumburg, IL (US); THERMOS K.K., Tsubame-shi, Nigata-ken (JP)

(72) Inventor: Yuu Kobayashi, Tsubame (JP)

(73) Assignees: THERMOS L.L.C., Schaumburg, IL (US); THERMOS K.K. (JP)

( * ) Notice: Subject to any disclaimer, the term of this patent is extended or adjusted under 35 U.S.C. 154(b) by 298 days.

(21) Appl. No.: 14/461,616

(22) Filed: Aug. 18, 2014

(65) Prior Publication Data
US 2015/0053549 A1    Feb. 26, 2015

(30) Foreign Application Priority Data
Aug. 20, 2013  (JP) .................................. 2013-170677

(51) Int. Cl.
*B08B 3/08*    (2006.01)
*C25B 9/06*    (2006.01)
(Continued)

(52) U.S. Cl.
CPC .................. *B08B 3/08* (2013.01); *C25B 1/00* (2013.01); *C25B 1/30* (2013.01); *C25B 9/00* (2013.01);
(Continued)

(58) Field of Classification Search
CPC .... C25B 9/06; C25B 9/12; C25B 1/30; B08B 3/08
(Continued)

(56) References Cited

U.S. PATENT DOCUMENTS 4,290,873 A * 9/1981 Weaver ............... C02F 1/46109
204/230.2
7,186,327 B1    3/2007 Russell

FOREIGN PATENT DOCUMENTS

DE    102010044315 A1 * 3/2012 .......... C02F 1/46104
EP    0246557 A1    11/1987
(Continued)

OTHER PUBLICATIONS

Koreyoshi Imamura et al.; "Removal of Proteinaaceous Soils Using Hydroxyl Radicals Generated by the Electrolysis of Hydrogen Peroxide"; Journal of Colloid and Interface Science; vol. 250; No. 2; May 15, 2002 (May 15, 2002); pp. 409-414.
(Continued)

*Primary Examiner* — Nicholas A Smith
(74) *Attorney, Agent, or Firm* — Polsinelli PC

(57) ABSTRACT

The object of the present invention is to provide a metal container washing apparatus which can obtain hydrogen peroxide for generating hydroxyl radicals and electrolytes using a simple configuration and a simple method and which is small and has excellent portability and storability, and the present invention provides a washing apparatus that washes a metal container of the present invention includes a negative electrode that applies a negative voltage to a metal container to which a washing solution, in which a hydrogen peroxide generating agent generating hydrogen peroxide when dissolved in water is dissolved, is added; a positive electrode that applies a positive voltage to the washing solution; and a power supply that applies a voltage between the negative electrode and the positive electrode, and the inner surface in the container is washed with hydroxyl radicals generated at the time of application of the voltage. It is possible to obtain both of hydrogen peroxide that generates hydroxyl radicals having a strong decomposition ability with respect to stains and electrolytes that allow the
(Continued)

washing solution to be electrolyzed with a low voltage such as a voltage that supplied by a battery.

12 Claims, 11 Drawing Sheets

(51) Int. Cl.
    *C25B 9/12*     (2006.01)
    *C25B 1/30*     (2006.01)
    *C25B 1/00*     (2006.01)
    *C25B 9/00*     (2006.01)
    *A47J 41/02*     (2006.01)

(52) U.S. Cl.
    CPC .................. *C25B 9/06* (2013.01); *C25B 9/12* (2013.01); *A47J 41/028* (2013.01)

(58) Field of Classification Search
    USPC ..................................................... 204/297.01
    See application file for complete search history.

(56) References Cited

FOREIGN PATENT DOCUMENTS

| | | |
|---|---|---|
| JP | 08-165600 A | 6/1996 |
| JP | 2002-173799 A | 6/2002 |
| JP | 2011-056422 A | 3/2011 |
| JP | 4912608 B | 4/2012 |
| WO | 2008 110587 A1 | 9/2008 |

OTHER PUBLICATIONS

EP 14180955.8 Extended Search Report mailed Dec. 15, 2014 (6 pages).

\* cited by examiner

METAL CONTAINER WASHING APPARATUS

RELATED APPLICATIONS

This application claims priority to Japanese Patent Application No. 2013-170677 filed Aug. 20, 2013, which is hereby incorporated by reference in its entirety.

FIELD OF THE INVENTION

The present invention relates to a metal container washing apparatus using hydroxyl radicals.

BACKGROUND OF THE INVENTION

In the related art, a THERMOS bottle or a tabletop pot such as a metal container accommodating beverages, for example coffee or tea, has a small opening and the inside portion thereof is difficult to wash. Accordingly, a sponge or the like having a shape appropriate for washing the inside of a container has been sold.

However, washing a THERMOS bottle or the like using a dedicated sponge whenever the THERMOS bottle or the like is used makes a user feel burdened. However, when washing is repeatedly performed with a simple method of only rinsing the inside of the container using water or a neutral detergent, stains from beverages such as coffee or tea stains attached to the surface in the container are not eliminated and therefore the surface of the container becomes gradually discolored. After the container is discolored in this manner, the stains cannot be eliminated using a sponge. In this case, it is necessary to wash the inside of the container with a washing solution in which an oxygen-based bleach or the like is dissolved. However, when the oxygen-based bleach is used, the container is required to be immersed in the washing solution for several hours to several tens of hours, hence a demand for quickly washing and then immediately using the THERMOS bottle or the like cannot be satisfied.

As a method for satisfying the above-described demand, a method of applying a positive voltage to an aqueous hydrogen peroxide solution and decomposing stains attached to an object to be washed using hydroxyl radicals generated by a negative voltage being applied to the object to be washed is known (for example, Japanese Unexamined Patent Application, First Publication Nos. 2002-173799 and 2011-56422).

Further, as a solid hydrogen peroxide generating agent that generates hydrogen peroxide by being dissolved in water, percarbonate, perborate, and the like are known (for example, Japanese Patent No. 4912608).

In Japanese Unexamined Patent Application, First Publication Nos. 2002-173799 and 2011-56422 described above, hydrogen peroxide is used. However, hydrogen peroxide is difficult to obtain in general. In addition, hydrogen peroxide is sold as oxidol having a concentration of approximately 3%, but a large amount thereof is necessary to be used for washing a container, so using hydrogen peroxide is not economic.

In Japanese Patent No. 4912608, as a chemical substance decomposition agent, an agent in which a solid hydrogen peroxide generating agent is dissolved in water is used. However, the chemical substance decomposition agent is an agent for efficiently cleaning a contaminated material such as soil or groundwater contaminated by a chemical substance. That is, a description or suggestion of the agent, in which a solid hydrogen peroxide generating agent is dissolved in water, and which generates hydroxyl radicals and decomposes stains attached to an object to be washed by the hydroxyl radicals, is not made at all.

Therefore, in light of the problems, an object of the invention of the present application is to provide a metal container washing apparatus which can obtain hydrogen peroxide for generating hydroxyl radicals and electrolytes using a simple configuration and a simple method and which is small and has excellent portability and storability.

SUMMARY OF THE INVENTION

According to an aspect of the invention, there is provided a metal container washing apparatus including a negative electrode that applies a negative voltage to a metal container containing a washing solution, in which a hydrogen peroxide generating agent generating hydrogen peroxide when dissolved in water is dissolved; a positive electrode that applies a positive voltage to the washing solution; and a power supply that applies a voltage between the negative electrode and the positive electrode, in which the surface in the container is washed with hydroxyl radicals generated at the time of application of the voltage.

In the metal container washing apparatus, it is preferable that the negative electrode come into contact with a metal portion of the container when placed on an opening of the metal container and the positive electrode have a rod shape and be movable in the metal container in a vertical direction.

In the metal container washing apparatus, it is preferable that the hydrogen peroxide generating agent be at least one selected from a group consisting of percarbonate, perborate, and persulfate.

In the metal container washing apparatus, it is preferable that the negative electrode electrically come into contact with and is connected to the metal portion of the container by being placed on an opening end of the container in which metal is exposed.

In the metal container washing apparatus, it is preferable that the negative electrode extending in the inside of the container electrically come into contact with and is connected to the metal portion in the container by being placed on the opening end of the container.

According to the metal container washing apparatus of the present invention, it is possible to obtain both hydrogen peroxide that generates hydroxyl radicals that have a strong decomposition ability with respect to stains and electrolytes that allow the washing solution to be electrolyzed with a low voltage, such as a voltage that supplied by a battery, by only dissolving the hydrogen peroxide generating agent in water. In addition, it is possible to decompose attached stains of beverages in a short period of time and cleanly wash the surface in the container using the hydroxyl radicals generated on the surface in the metal container to which a negative voltage is applied.

Since the washing solution is filled in the erected metal container and the washing apparatus is placed on the opening of the container, a direct connection between the negative electrode of the washing apparatus and the metal container and a connection between the positive electrode and the metal container through the washing solution become easy, and the metal container can be washed in a stabilized installation state. In addition, since a position of the positive electrode can be moved in the vertical direction, current distribution on the surface in the container can be uniform and washing unevenness can be minimized by appropriately changing the distance between the container and the positive electrode even in a case of a container with a different depth.

In addition, since percarbonate, perborate, and persulfate can be easily obtained as an oxygen-based bleach, a hydrogen peroxide generating agent can be easily obtained.

Further, it is possible for the negative electrode to electrically come into contact with and be connected to the exposed metal portion of the opening of the container by only placing the washing apparatus on the opening end of the container.

Moreover, since the negative electrode of the washing apparatus extends to the inside of the container, it is possible for the negative electrode entering the inside of the container to electrically come into contact with and be connected to the metal portion in the container by only placing the washing apparatus on the opening end of the container even when the opening end of the container is covered with a non-conductive material such as a resin.

DETAILED DESCRIPTION OF THE INVENTION

Preferred Examples of a washing apparatus of the present invention will be described in detail with reference to the accompanying drawings.

In addition, the Examples described below do not limit the aspects of the present invention. Further, all configurations described below are not necessarily required to establish the present invention.

Example 1

(Metal Container Washing Apparatus for Metal Container Including Opening End of Container Whose Metal is Exposed)

FIGS. 1 to 5 show a metal container washing apparatus according to Example 1 of the present invention.

Figure 1:
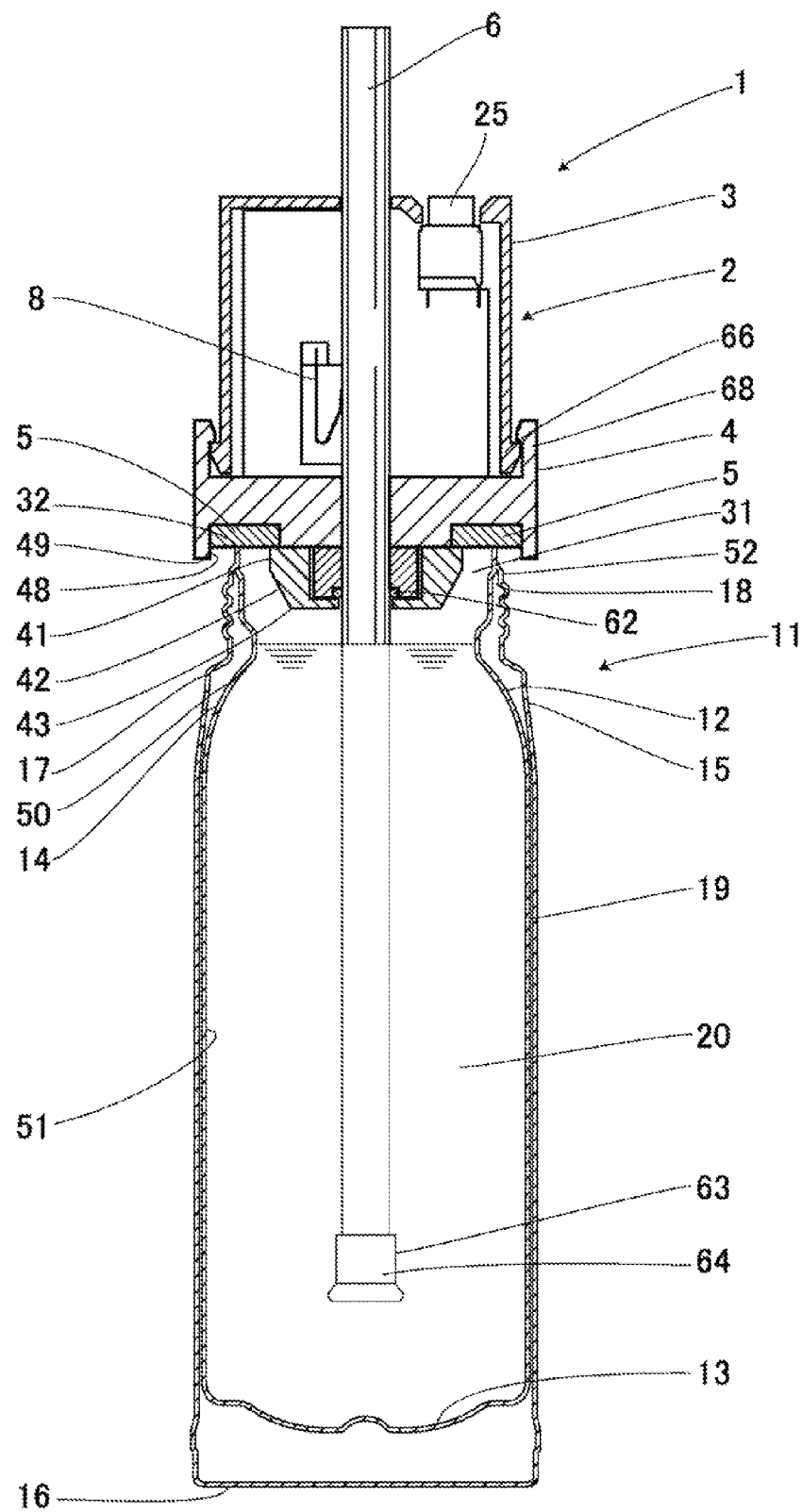
FIG. 1 is a cross-sectional view showing a washing apparatus according to Example 1 of the present invention.
Figure 2:
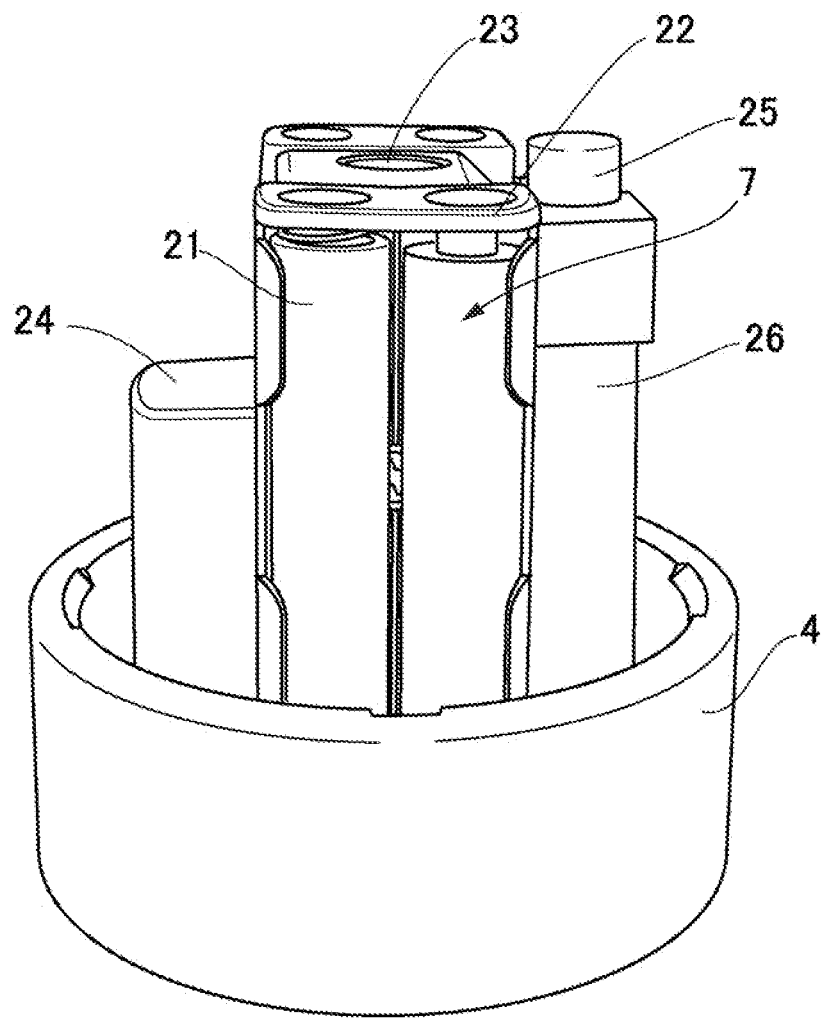
FIG. 2 is a perspective view of the washing apparatus according to Example 1 of the present invention in a state in which a lid of an apparatus body is detached.

FIG. 1 is a cross-sectional view showing a state in which a washing apparatus 1 of the present Example is placed on an opening 31 of a metal container 11. The washing apparatus 1 includes an apparatus body 2. The apparatus body 2 is configured of a lid 3 and a base 4, and a negative electrode 5 is provided in the base 4. A rod-shaped positive electrode 6 is inserted into the center of the apparatus body 2. The lid 3 and the base 4 are made of, for example, a resin. FIG. 2 is a perspective view showing the washing apparatus in a state in which the lid 3 of the apparatus body 2 is detached. As shown in the same figure, a battery box 22 accommodating a battery 21 which is a power supply 7 not shown in FIG. 1 is provided on the base 4. Further, a positive electrode insertion portion 23 to which the positive electrode 6 is inserted, a plate spring accommodating member 24 that accommodates a plate spring 8, a switch 25 that turns the power supply 7 on or off, and a switch base 26 on which the switch 25 is placed are provided on the base 4.

The metal container 11 shown in FIG. 1 is a metallic vacuum double container. As shown in the same figure, the metal container 11 is obtained by bonding an upper opening 18 of an inner container 14 including an inner bottom plate portion 13 on the bottom of an inner cylindrical portion 12 to the upper opening 18 of an outer container 17 including an outer bottom plate portion 16 on the bottom of an outer cylindrical portion 15. In addition, a vacuum insulation space 19 is formed in a gap between the inner container 14 and the outer container 17. In this manner, an opening end 32 of the container which is a joint of the inner container 14 and the outer container 17 is formed on the outer periphery of the opening 31 of the metal container 11. At the opening end 32 of the container, the metal is exposed. Thereby, the negative voltage can be applied to the metal container 11 by applying the negative voltage to the opening end 32 of the container. The inner container 14 and the outer container 17 are respectively formed of, for example, stainless steel.

When the metal container 11 is washed, a washing solution 20 in which a hydrogen peroxide generating agent generating hydrogen peroxide when dissolved in water is dissolved, is added to the inside of the metal container 11.

Figure 3:
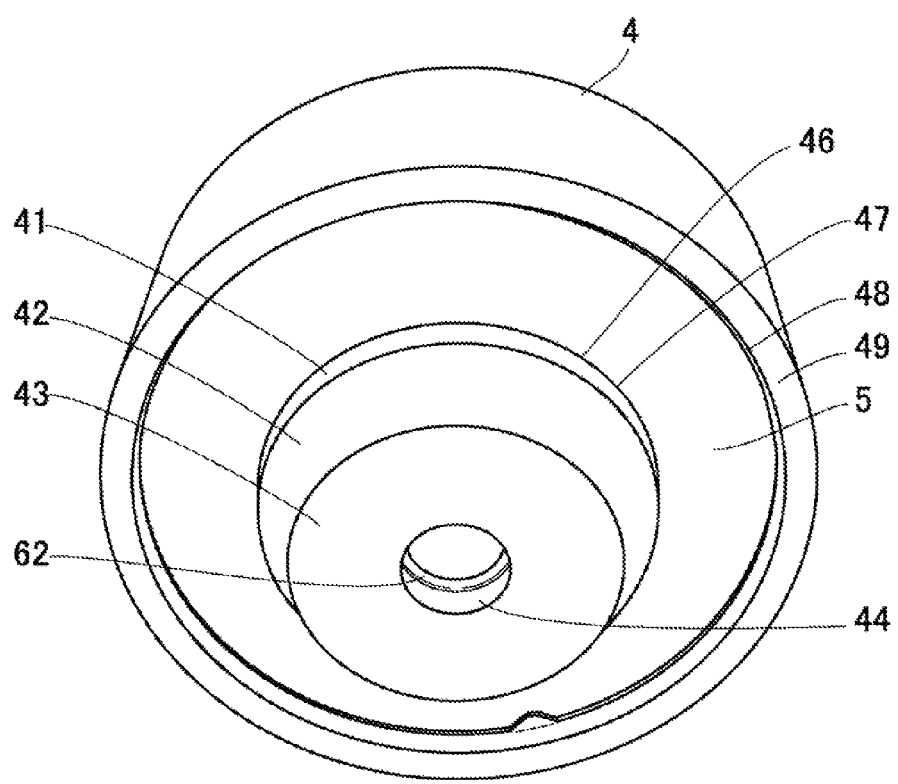
FIG. 3 is a perspective view when a base of the washing apparatus according to Example 1 of the present invention is seen from a bottom surface side thereof.

FIG. 3 is a perspective view showing the base 4 when seen from the bottom surface side. A step portion 43, which includes a cylindrical portion 41 and a reversed truncated cone-shaped cone portion 42 whose diameter becomes gradually smaller downward from a lower end of the cylindrical portion 41, is formed in a center portion of the bottom surface of the base 4. The step portion 43 is made of the same resin as that of the lid 3 and the base 4. The positive electrode 6 to be inserted into a lower opening 44 of the center of the step portion 43 is not in contact with the metal container 11.

The negative electrode 5 is, for example, a flat disk-shaped negative electrode formed of stainless steel to have a plane donut shape, and is connected to the negative pole of the power supply 7. In addition, the negative electrode 5 is fixed to the lower surface of the washing apparatus 1 in contact with the metal container 11. In this manner, the negative voltage can be applied to the negative electrode 5 from the power supply 7.

A negative electrode hole 46 is formed in the center portion of the flat disk-shaped negative electrode 5. The diameter of a negative electrode hole 46 is greater than that of the rod-shaped positive electrode 6 connected to the positive pole of the power supply 7 and thus the negative electrode 5 is not in contact with the positive electrode 6. In addition, the inner diameter of the flat disk-shaped electrode 5, that is, the diameter of the negative electrode hole 46 is slightly greater than the diameter of the upper edge 47 of the step portion 43. Further, the outer diameter of the flat disk-shaped electrode 5 is slightly smaller than the diameter of a lower inner peripheral edge 48 of the base 4. By such a configuration, the negative electrode 5 can be fitted between the step portion 43 and the lower inner peripheral edge 48 of the base 4. Since the lower inner peripheral edge 48 protrudes farther than the negative electrode 5, the lower inner peripheral edge 48 functions as a peripheral edge step portion 49 such that the washing apparatus 1 does not fall off from the opening 32 of the container.

Moreover, since the width of the flat disk-shaped negative electrode 5 in the radial direction is greater than that of the opening 32 of the container, the washing apparatus 1 can be stably placed thereon. In addition, the negative electrode 5 can come into contact with and be electrically connected to the opening end 32 of the container whose metal is exposed by only placing the washing apparatus 1 on the opening end 32 of the container. That is, since the negative electrode 5 comes into contact with and is electrically connected to the metal portion 50 of the container by only placing the washing apparatus 1 on the opening end 32 of the container, the negative voltage can be applied to the metal portion 50 of the container in which stains are attached to the inner surface 51 in the container. Further, the negative electrode 5 of the flat disk-shaped negative electrode 5 having a predetermined width can also be used for the metal container 11 in which the size of the opening 31 is different, so that versatility is improved.

The negative electrode 5 is not required to be in contact with the whole periphery of the opening end 32 of the container and may be in contact with a part thereof. Therefore, the negative electrode 5 may not be the flat disk-shaped negative electrode 5 having a plane donut shape but may be a small piece flat electrode. Moreover, the negative electrode 5 may not be flat, and, for example, the negative electrode 5 may be formed to sandwich a part of the opening end 32 of the container such as a clip or to be in contact with an outside 52 of the opening end 32 of the container.

The rod-shaped positive electrode 6 is inserted into the positive electrode insertion portion 23 communicating an upper opening 61 formed on the lid 3 with the lower opening 44 formed on the step portion 43. The metallic plate spring 8 connected to the positive pole of the power supply 7 is in pressure contact with the positive electrode 6. In this manner, the positive voltage can be applied to the positive electrode 6 from the power supply 7. Further, the positive electrode 6 can be moved in the vertical direction in a state of maintaining the connection of the positive electrode 6 and the positive pole of the power supply 7. In addition, as shown in FIG. 3, a ring-shaped packing 62 is provided in the middle of the positive electrode insertion portion 23 in the step portion 43. By maintaining the rod-shaped positive electrode 6 with the plate spring 8 and the packing 62, it is possible to reliably prevent the positive electrode 6 from falling out. At the time of using the washing apparatus 1, the positive electrode 6 is inserted into the washing solution 2 in the metal container 11. Accordingly, the positive voltage can be applied to the washing solution 20 by the positive electrode 6. The positive electrode 6 is made of, for example, stainless steel.

Further, since the positive electrode 6 is maintained by the plate spring 8 and the packing 62, the positive electrode 6 can be easily inserted into or taken out of the positive electrode insertion portion 23. Therefore, after the metal container 11 is washed, the positive electrode 6 can be detached and then easily washed when stains or the like are attached to the positive electrode 6 or when discoloration occurs.

A tip 63 on the container side of the positive electrode 6 is covered with a tip cover 64 formed of a non-conductive member made of a resin or the like, and is configured such that the positive electrode 6 and the metal container 11 are not in direct contact with each other.

Figure 4:
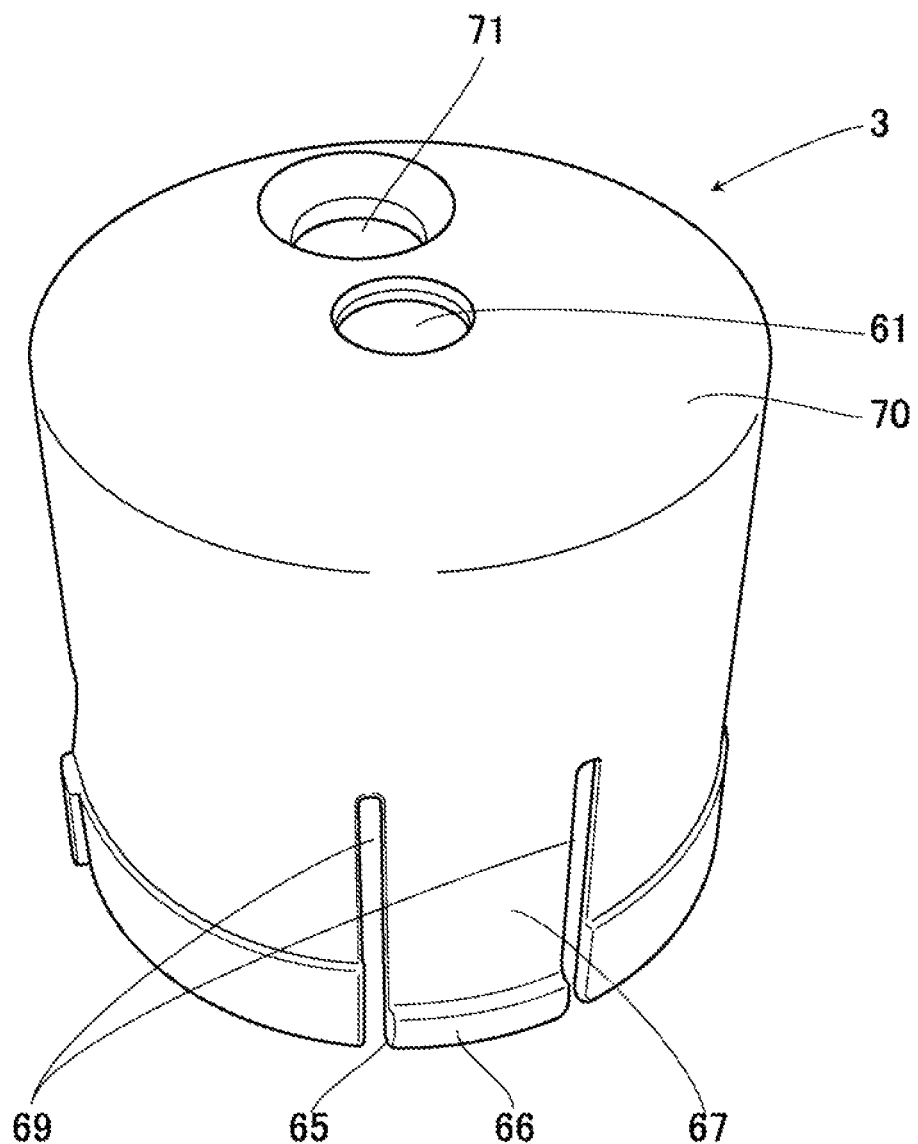
FIG. 4 is a perspective view of the lid of the washing apparatus according to Example 1 of the present invention.

FIG. 4 is a perspective view of the lid 3 and the lid 3 includes a locking portion 67 having a locking pawl 66 in a lower end 65. The locking pawl 66 is locked to a lock-receiving portion 68 of the base 4 and the lid 3 is fixed to the base 4. A slit 69 having a predetermined length is provided on both side portions of the locking portion 67 in the vertical direction and the locking portion 67 can be pressed and moved inward of the lid 3. Consequently, by pressing and moving the locking portion 67 inward of the lid 3, it is possible for the lid 3 to be easily attached to or detached from the base 4. Moreover, the upper opening 61 in which the positive electrode 6 is inserted and a switch opening 71 in which the switch 25 is exposed are provided on an upper surface 70 of the lid 3.

In addition, the washing apparatus 1 can be turned on or off by the switch 25, the washing apparatus is electrified and the voltage is applied between the negative electrode 5 and the positive electrode 6 in a state in which power is on, and electrification is shut down in a state in which power is off. The user can operate the switch 25 to switch on or off, but the washing apparatus may have a timer function such that the washing apparatus is turned off at a desired time.

When the washing apparatus 1 is placed on the opening end 32 of the container of the metal container 11 to which the washing solution 20 is added and the voltage is applied between the negative electrode 5 and the positive electrode 6 by operating the switch 25, the negative voltage is applied to the metal container 11 and the positive voltage is applied to the washing solution 20. In this manner, it is possible for the washing solution 20 to generate hydroxyl radicals (.OH), to decompose stains attached to the inner surface 51 in the metal container 11, and to wash the inner surface 51 in the container.

It is preferable that the hydrogen peroxide generating agent be any one selected from the group consisting of percarbonate, perborate, and persulfate or a mixture containing two or more selected from the group. Further, sodium percarbonate, sodium perborate, and sodium persulfate are desirable because of availability. These hydrogen peroxide generating agents can be used alone or in a mixture. In addition, sodium percarbonate, sodium perborate, and sodium persulfate are prescribed in Japanese Standards of Quasi-drug Ingredients 2006.

With respect to the metal container 11 having a volume of 200 mL to 3000 mL, a desired current density can be obtained and a washing process is completed within 1 minute to 10 minutes by setting a voltage to be applied between the negative electrode 5 and the positive electrode 6 at 1.5 V to 15 V and applying a concentration of the hydrogen peroxide generating agent at 1 wt % to 10 wt %. When the voltage and the concentration of the hydrogen peroxide generating agent are within the above-described ranges, washing is completed in a desired time period. Further, the battery 21 or the hydrogen peroxide generating agent is not wasted, and therefore it is economically preferable.

Since the washing apparatus 1 of the present Example is operated at a low voltage, the battery 21 or the like can be used as the power supply 7. Therefore, electroshock can be prevented and the washing apparatus may be used safely.

In the present Example, since the negative electrode 5, the positive electrode 6, and the power supply 7 integrally form an apparatus, the washing apparatus 1 is small and has excellent portability and storability.

In addition, the power supply 7 is not limited to the battery 21, and, for example, an adapter that converts a household 100 V AC power supply to a direct current may be used.

Figure 5:
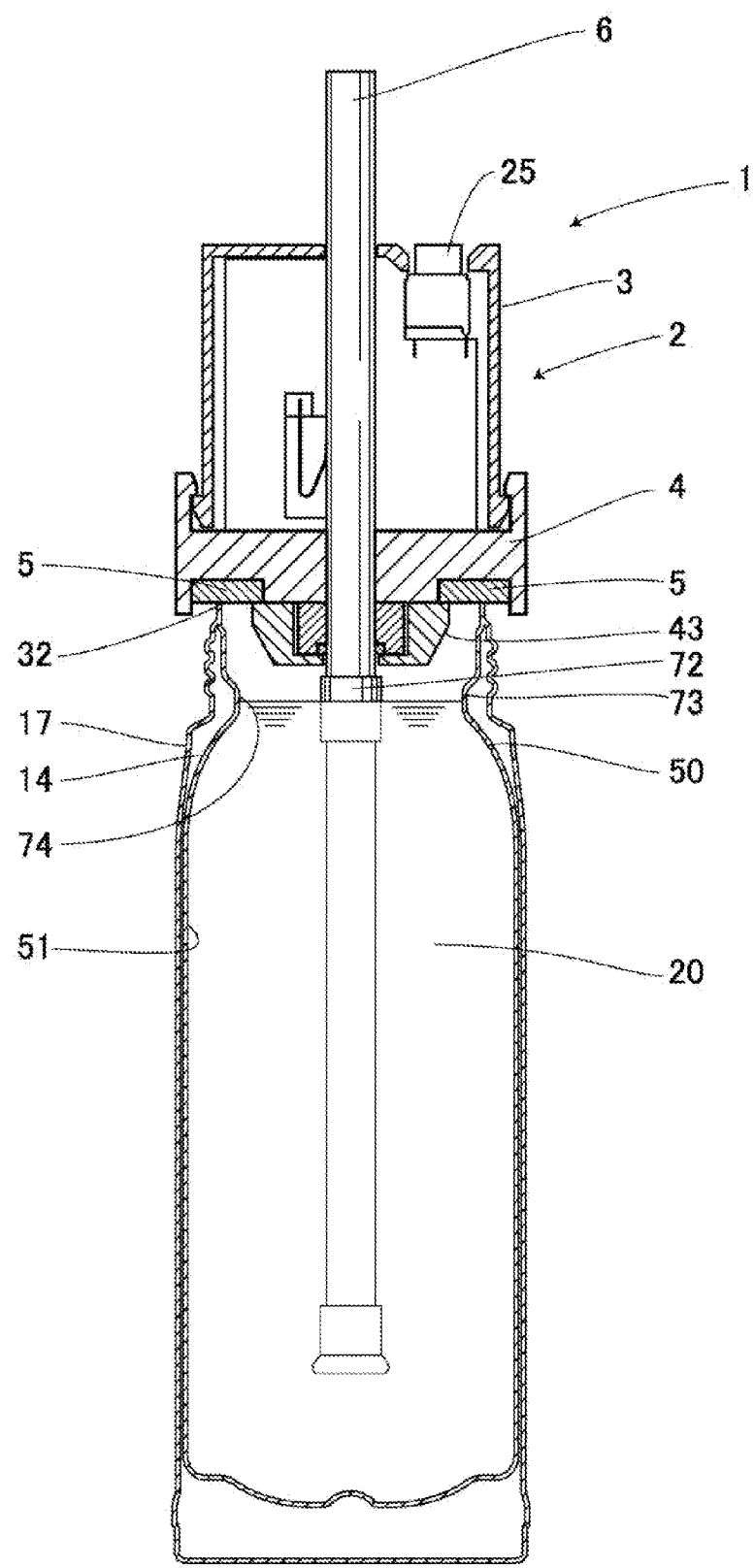
FIG. 5 is a cross-sectional view showing a status in which a cover is covered in a part of the positive electrode of the washing apparatus according to Example 1 of the present invention.

In addition, as shown in FIG. 5, a part of the positive electrode 6 may be covered by the cover 72 formed of a non-conductive member such as a resin. By covering a part of the positive electrode 6 with the cover 72, current distribution can be adjusted. Particularly, in a THERMOS bottle, in order to ensure water cut-off performance, the diameter in the vicinity of the opening on the inner surface of the container is squeezed so as to be reduced. In this case, the distance between the positive electrode 6 and an inner surface 74 of the container becomes short on a small-diameter portion 73 having a small diameter so that current distribution is concentrated. In contrast, uniform washability can be obtained by covering a part of the positive electrode 6 in the vicinity of the small-diameter portion 73 with the cover 72.

The washing apparatus of the present Example includes the negative electrode 5 that applies the negative voltage to the metal container 11 containing the washing solution 20 in which the hydrogen peroxide generating agent generating hydrogen peroxide when dissolved in water is dissolved, the positive electrode 6 that applies the positive voltage to the washing solution 20, and the power supply 7 that applies the voltage between the negative electrode 5 and the positive electrode 6. It is possible to easily obtain both of hydrogen peroxide that generates hydroxyl radicals having a strong decomposition ability with respect to stains and electrolytes that allow the washing solution 20 to be electrolyzed with a low voltage such as the battery 21 by only dissolving the hydrogen peroxide generating agent in water. Further, attached stains of beverages are decomposed in a short period of time and the inner surface 51 in the container can be cleanly washed using hydroxyl radicals generated on the inner surface 51 in the metal container 11 to which the negative voltage is applied.

Moreover, in the washing apparatus of the present Example, the negative electrode 5 is electrically connected to the metal portion 50 of the container when placed on the opening 31 of the metal container 11. The positive electrode 6 has a rod shape and can be moved in the metal container 11 in the vertical direction. By only filling the erected metal container 11 with the washing solution 20 and placing the washing apparatus 1 on the opening 31 of the container, the negative electrode 5 of the washing apparatus 1 can be directly connected to the metal container 11 and the positive electrode 6 can be connected to the metal container 11 through the washing solution 20 at the same time. Further, the metal container 11 can be washed in a stabilized installation state. In addition, since the position of the positive electrode 6 can be moved in the vertical direction, the current distribution of the inner surface 51 in the container can be uniform and washing unevenness can be minimized by appropriately changing the distance between the container and the positive electrode 6 even in a case of the container with different depth.

In addition, in the washing apparatus of the present Example, the hydrogen peroxide generating agent is any one selected from the group consisting of percarbonate, perborate, and persulfate or a mixture containing two or more selected from the group. Since the percarbonate, perborate, and persulfate can be easily obtained as an oxygen-based bleach, the hydrogen peroxide generating agent can be easily obtained.

Further, in the washing apparatus of the present Example, the negative electrode 5 can come into contact with and be electrically connected to the exposed metal of the opening end 32 of the container by only placing the washing apparatus 1 on the opening end 32 of the container.

Example 2

Figure 6:
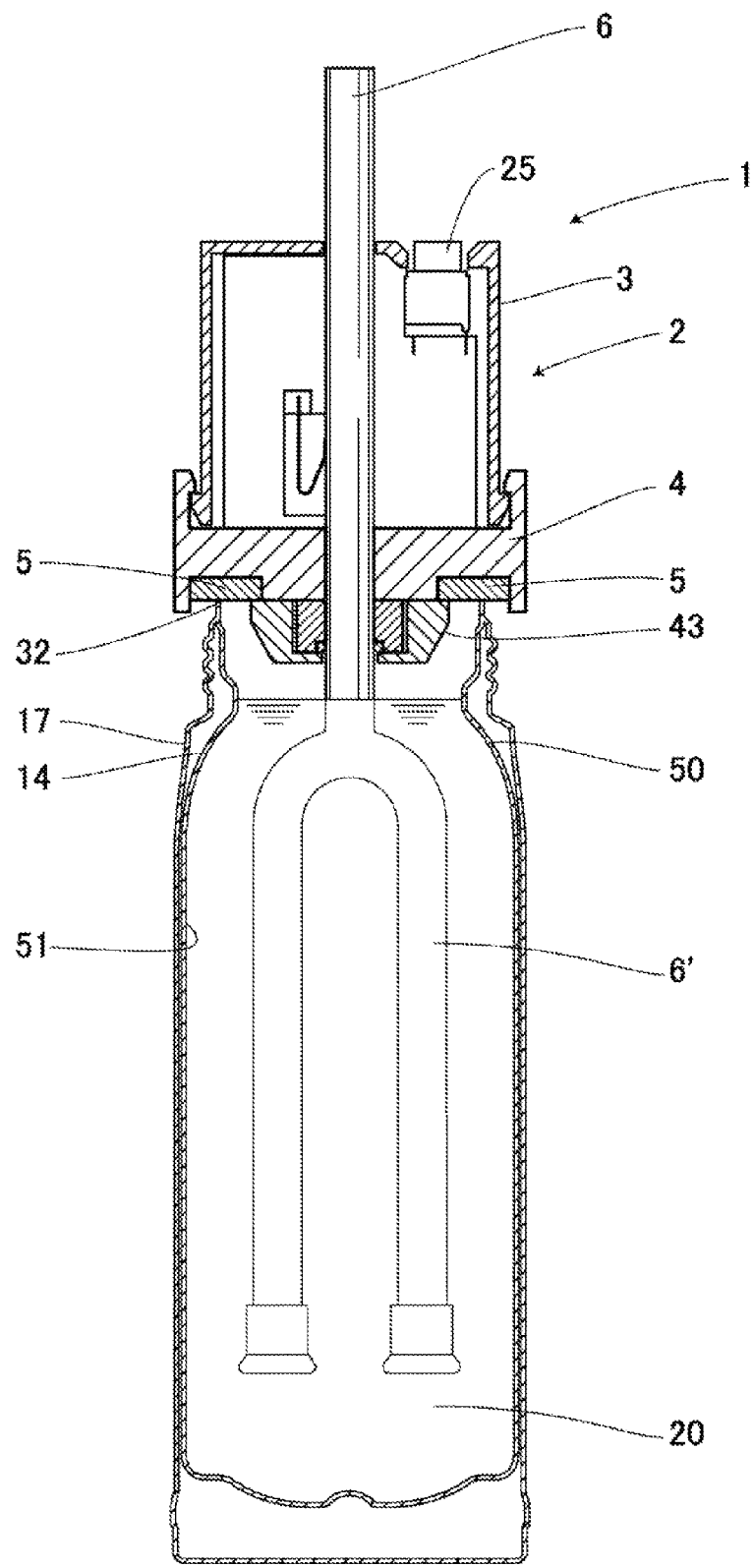
FIG. 6 is a cross-sectional view showing a washing apparatus according to Example 2 of the present invention.

FIG. 6 shows a washing apparatus according to Example 2 of the present invention. In the present Example, the same components as those in Example 1 described above are denoted by the same reference numerals and a detailed description thereof will not be repeated here.

In this Example, a positive electrode 6' is formed to have a shape along the shape of an inner surface 51 in a container. While the positive electrode 6 of Example 1 is positioned approximately in the center of the metal container 11, the positive electrode 6' of the present Example is arranged in a position closer to the inner surface 51 in the container than the center position. In addition, in FIG. 6, the positive electrode 6' is divided into two sections, but may be divided into three or more sections such that the current distribution of the inner surface 51 in the container becomes large and uniform. In the present Example, by allowing actions and effects which are the same as those of Example 1 described above to be exhibited and allowing the shape of the positive electrode 6' to be the shape of the surface in the container, the positive electrode 6' can be made closer to the inner surface 51 in the container compared to the case of the positive electrode 6.

Example 3

(Metal Container Washing Apparatus for Washing Metal Container Having Opening End Covered with Resin)

Figure 7:
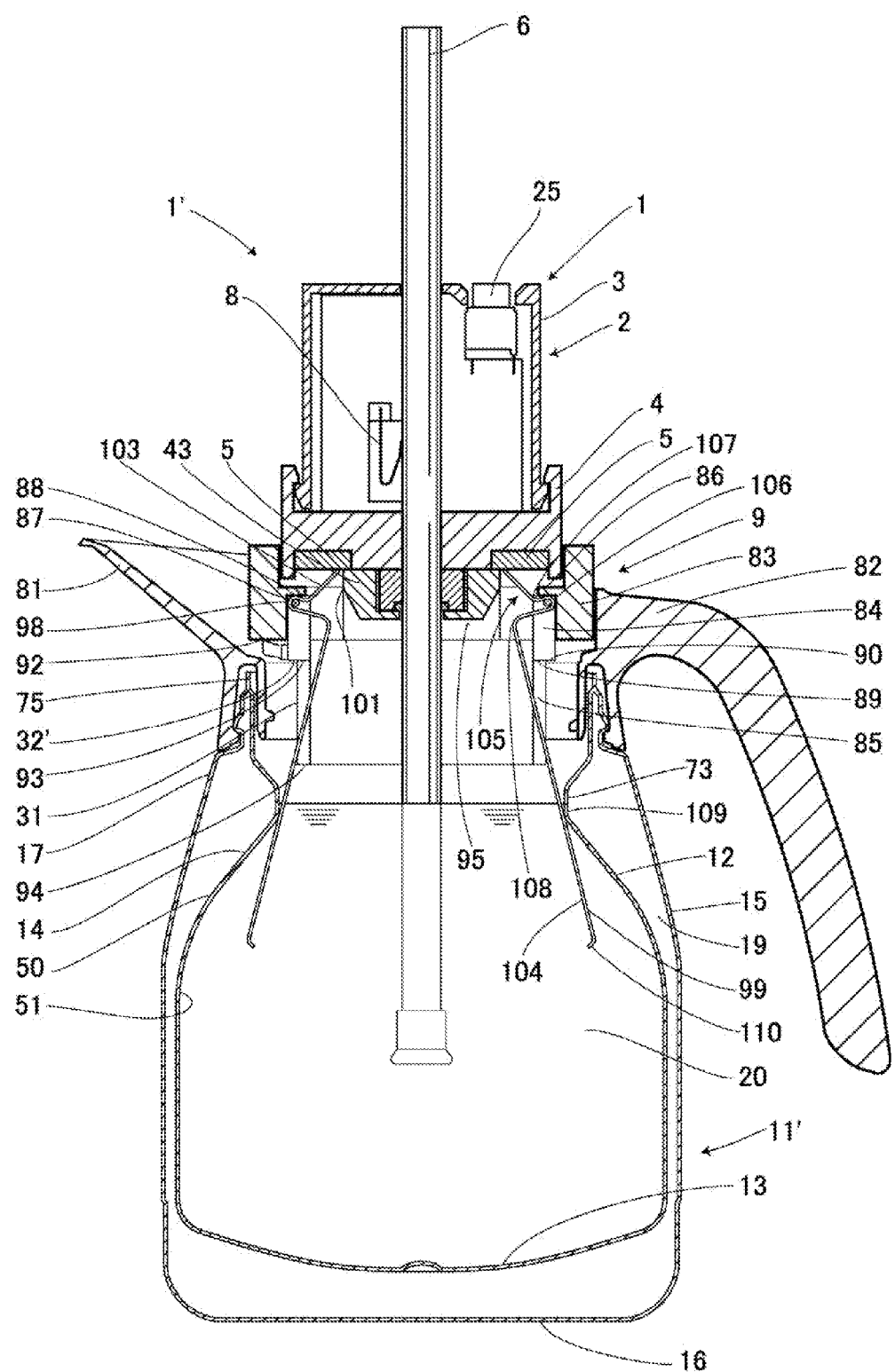
FIG. 7 is a cross-sectional view showing a washing apparatus according to Example 3 of the present invention.

FIG. 7 shows a washing apparatus according to Example 3 of the present invention. In the present Example, the same components as those in Example 1 described above are denoted by the same reference numerals and a detailed description thereof will not be repeated here.

A metal container 11' of FIG. 7 is a metallic vacuum double container in the same manner as the case of Example 1. However, in the metal container 11', a metal opening end 75 to which respective upper openings 18 of an inner container 14 and an outer container 17 are bonded is covered with a spout member 81 made of a resin and a handle member 82. Accordingly, the metal is not exposed in the opening end 32 of the metal container 11' and the washing apparatus 1 of Example 1 cannot be used as before. For this reason, the washing apparatus 1' of the present Example includes an auxiliary member 9 to be used by being combined with the washing apparatus 1 of Example 1. The auxiliary member 9 is made of, for example, a resin.

Figure 8:
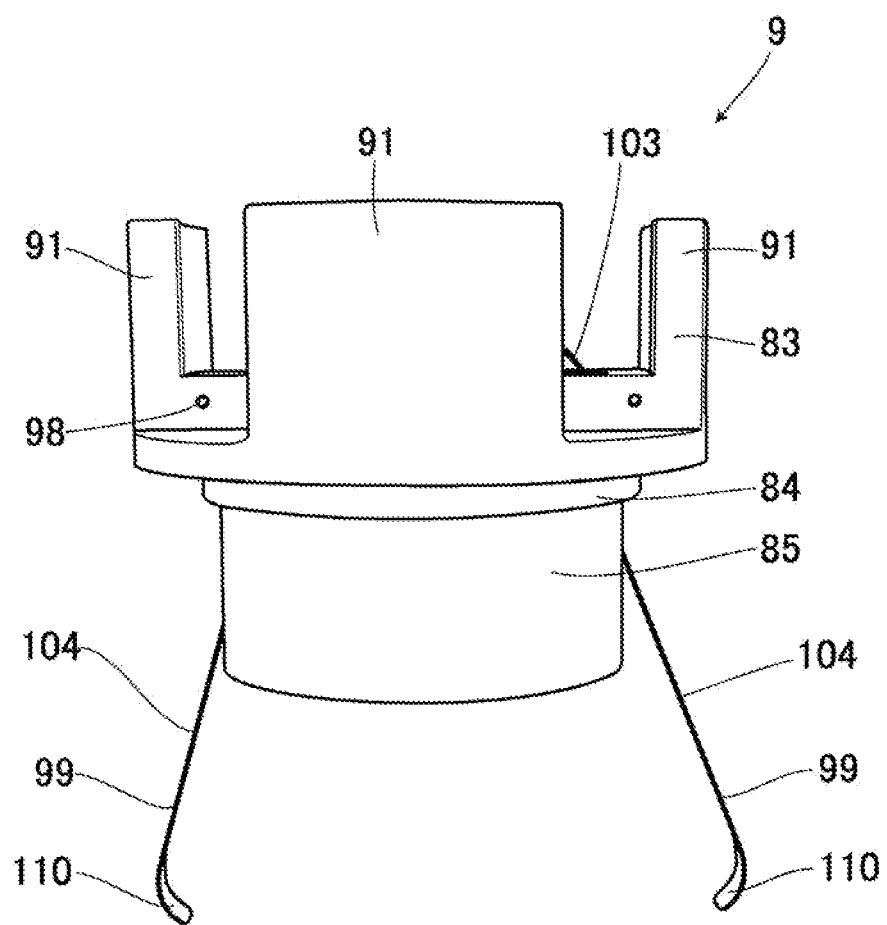
FIG. 8 is a side view of an auxiliary member of the washing apparatus according to Example 3 of the present invention.
Figure 9:
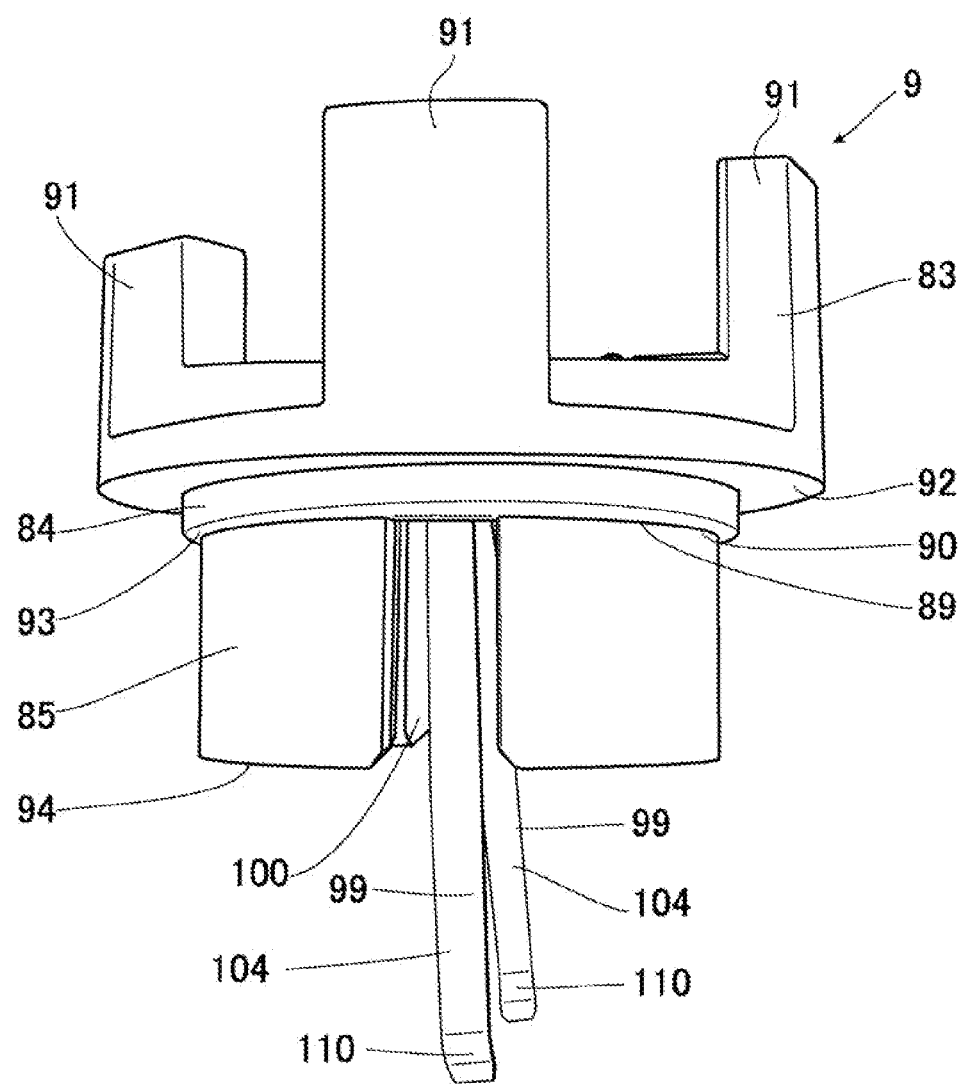
FIG. 9 is a perspective view of the auxiliary member of the washing apparatus according to Example 3 of the present invention.
Figure 10:
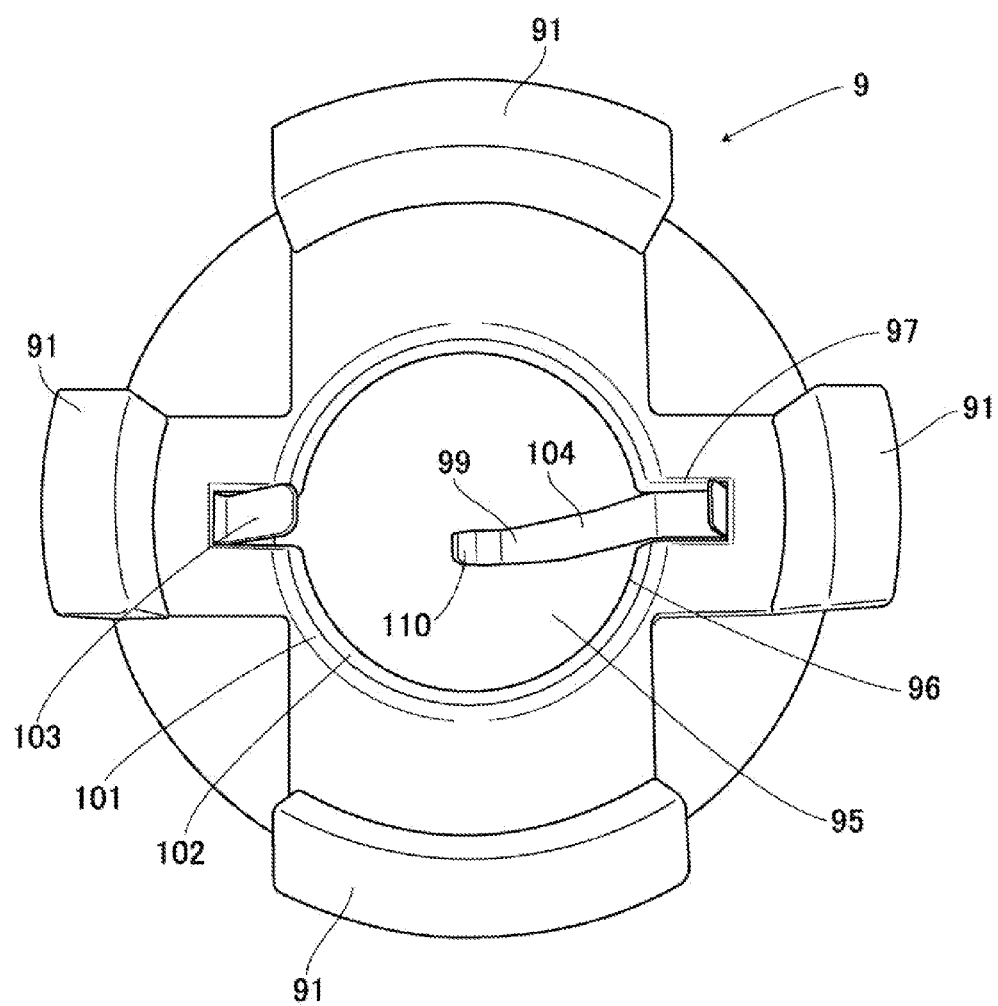
FIG. 10 is a top view showing the auxiliary member of the washing apparatus according to Example 1 of the present invention.

FIGS. 8 to 10 show the auxiliary member 9 of the present Example. The auxiliary member 9 includes an upper cylindrical portion 83, a middle cylindrical portion 84 having a diameter smaller than that of the upper cylindrical portion 83, and a lower cylindrical portion 85 having a diameter of the outer periphery smaller than that of the middle cylindrical portion 84. A flange portion 86 is provided in the upper cylindrical portion 83. An upper surface 87 of the middle cylindrical portion 84 is brought into contact with a lower surface 88 of the flange portion 86. An upper surface 89 of the lower cylindrical portion 85 is brought into contact with a lower surface 90 of the middle cylindrical portion 84. In addition, as shown in FIG. 10, the upper cylindrical portion 83 is divided into four auxiliary step portions 91. Unintentional detachment of the washing apparatus 1 of Example 1 is prevented by the auxiliary step portion 91. The number of the auxiliary step portions 91 is not limited to four and may be another number, or the auxiliary step portion 91 may surround the whole periphery of a first bottom surface 92 of the upper cylindrical portion 83 without being divided.

Further, a hole 95 for a step portion corresponding to the step portion 43 of the base 4 is formed in the center of the upper cylindrical portion 83. In addition, a groove 97 for an auxiliary electrode is formed toward a direction outside from an outer peripheral edge 96 of the hole 95 for a step portion. A rotating shaft 98 extending in the horizontal direction is provided in the upper end portion of the middle cylindrical portion 84 which is the outer end of the groove 97 for an auxiliary electrode. Further, a slit 100 is provided on the side surface of the lower cylindrical portion 85 corresponding to a position of an auxiliary electrode 99 which is the negative electrode of the present Example.

As shown in FIG. 7, the step portion 43 comes in contact with an upper edge 101 of the hole 95 for a step portion when the washing apparatus 1 of Example 1 is placed on the auxiliary member 9. As shown in FIG. 10, a tapered portion 102 may be provided on the upper edge 101 of the hole 95 for a step portion such that the washing apparatus 1 is stably placed thereon.

Moreover, for example, a stainless steel auxiliary electrode 99 extending downward is provided in the auxiliary member 9. The auxiliary electrode 99 includes a protruding electrode portion 103 that protrudes from the groove 97 for an auxiliary electrode and a contact electrode portion 104 that extends downward from the auxiliary member 9 and is in contact with the metal portion 50 in the container. Further, a lower end (tip) 110 of the auxiliary electrode 99 is a free end. In addition, a rotating unit 105 attached to the rotating shaft 98 of the auxiliary member is formed between the protruding electrode portion 103 and the contact electrode unit 104 as shown in FIG. 7. The rotating unit 105 includes a curved portion 106 according to the diameter of the rotating shaft 98. A first bent portion 107 is formed between the protruding electrode portion 103 and the curved portion 106 and a second bent portion 108 is formed between the curved portion 106 and the contact electrode portion 104. Since the first bent portion 107 and the second bent portion 108 are bent toward directions which are opposite to each other, when the protruding electrode portion 103 is pressed down, the auxiliary electrode 99 rotates about the rotating shaft 98 and the contact electrode portion 104 is pushed and widened outwardly. When the contact electrode portion 104 is pushed and widened outwardly, the contact electrode portion 104 passes through the slit 100. Therefore, the contact electrode portion 104 can be pushed and widened to at least the outside of the lower cylindrical portion 85 of the auxiliary member 9.

When the auxiliary member 9 is placed on an opening end 32' of the container, the auxiliary electrode 99 is inserted into the inside of the container. When the washing apparatus 1 of Example 1 is placed on the auxiliary member 9, the protruding electrode portion 103 comes into contact with the negative electrode 5 and the protruding electrode portion 103 is pressed down. When the protruding electrode portion 103 is pressed down, the auxiliary electrode 99 rotates about the rotating shaft 98 and the contact electrode portion 104 is pressed and widened outwardly. The pressed and widened contact electrode portion 104 comes into contact with and electrically connects to a metal portion 109 in the container which is the metal portion 50 in the container, and the negative voltage is applied to the metal portion 109 in the container. In this manner, the negative voltage can be applied to the metal portion 109 in the container by only placing the washing apparatus 1' on the opening end 32' of the container.

In FIG. 7, a second bottom surface 93 of the middle cylindrical portion 84 is in contact with the opening end 32' of the container. However, a first bottom surface 92 of the upper cylindrical portion 84 or a third bottom surface 94 of the lower cylindrical portion 85 is in contact with the opening end 32' of the container according to the size of the diameter of the opening end 32' of the container. Accordingly, the washing apparatus 1' of the present Example can correspond to the metal container 11' having a different size of the opening 31 of the container, and the versatility becomes excellent.

In this manner, in the washing apparatus of the present Example, even when the opening end 32' of the container is covered with non-conductive members 81 and 82 such as a resin, the negative electrode 99 added to the inside of the container can come into contact with and be electrically connected with the metal portion 109 in the container by only placing the washing apparatus 1' on the opening end 32' of the container.

Example 4

Figure 11:
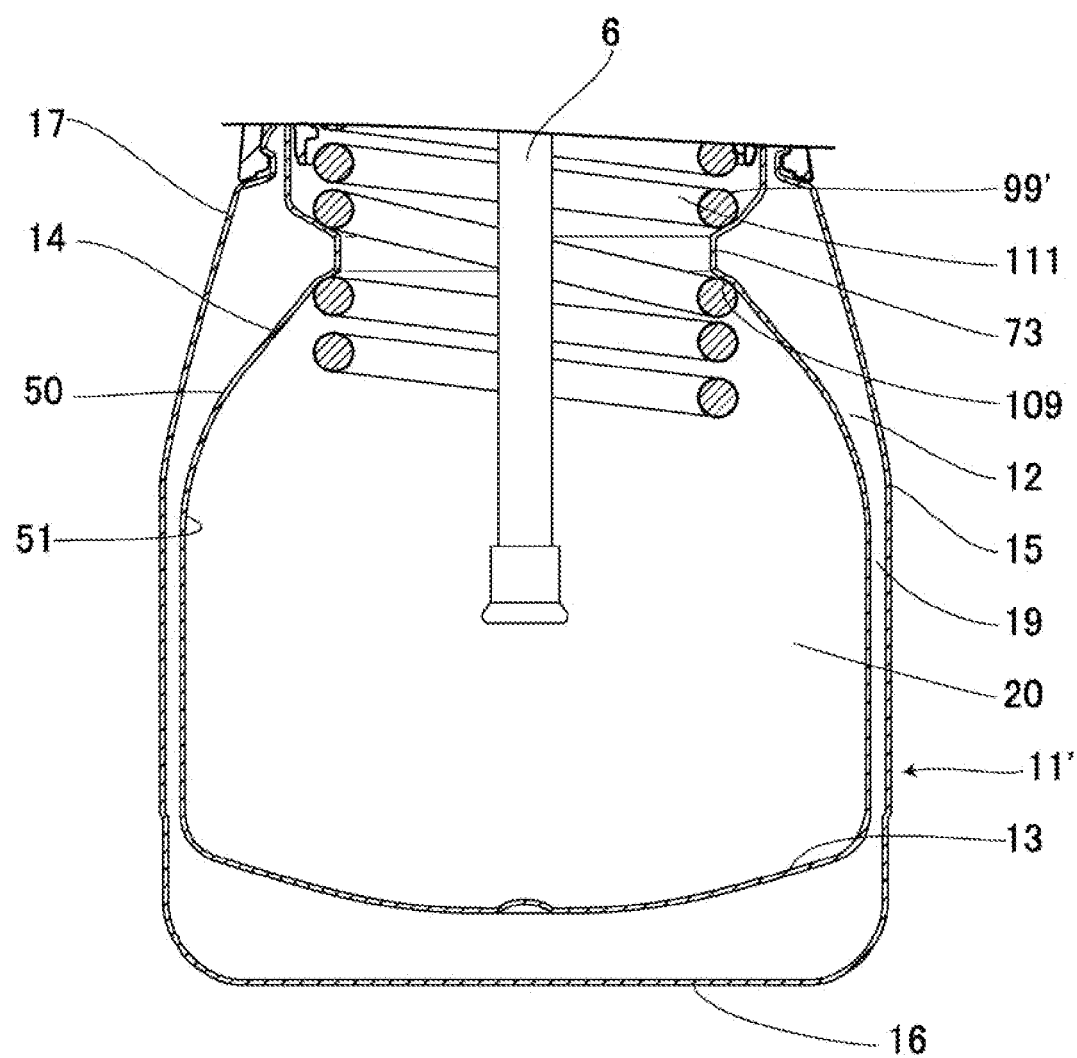
FIG. 11 is a cross-sectional view showing a washing apparatus according to Example 4 of the present invention.

FIG. 11 shows a washing apparatus according to Example 4 of the present invention. In the present Example, the same components as those in Examples 1 to 3 described above are denoted by the same reference numerals and a detailed description thereof will not be repeated here.

A washing apparatus 1' of the present Example includes an auxiliary electrode 99' having a shape different from that of Example 3. In this Example, the auxiliary electrode 99' which is a negative electrode is a coiled electrode 111 having a diameter greater than that of a small-diameter portion 73. The coiled electrode 111 comes into contact with and is electrically connected to a metal portion 109 in the container in a biased state by screwing the coiled electrode 111 to the small-diameter portion 73. Accordingly, in the present Example, actions and effects which are the same as those of Example 3 are exhibited, and a contact area between the auxiliary electrode 99' and the metal portion 109 in the container can be made larger.

Further, the present invention is not limited to the Examples and various modifications are possible within the range not departing from the scope of the present invention.

For example, the negative electrodes 6 may be plural. By providing a plurality positive electrodes 6, the current distribution of the inner surface 51 in the container becomes larger and more uniform.

Further, in the washing apparatus 1' of Example 3, a case in which the washing apparatus 1 and the auxiliary member 9 of Example 1 are separately provided is described, but they may be integrally formed. Furthermore, the auxiliary electrode 99 may be used alone or a plurality of auxiliary electrodes 99 may be used. Furthermore, the auxiliary electrode 99 may be biased so as to be widened outwardly in advance or may extend downward in the vertical direction.

While preferred Examples of the invention have been described and shown above, it should be understood that these are exemplary examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A metal container washing apparatus configured to wash a metal container for accommodating beverages, the metal container washing apparatus, comprising:
   a first electrode configured to apply a negative voltage to the metal container;
   a second electrode positioned and configured to apply a positive voltage to a washing solution in the metal container such that when the metal container contains a washing solution having a hydrogen peroxide generating agent and water, the hydrogen peroxide generating agent is dissolved to create hydroxyl radicals for washing an inner surface of the metal container;
   a power supply that applies a voltage between the first electrode and the second electrode, and an apparatus body including a base, the base configured to support the first electrode and the second electrode, and a lower surface of the base sized and shaped to be positioned across an opening end of the metal container; and,
   the base includes a step portion having a cylindrical portion and a reversed truncated cone-shaped portion, the step portion also having a lower opening configured to have the second electrode inserted therethrough.

2. The metal container washing apparatus according to claim 1,
   the second electrode has a rod shape and is movable in the metal container in a vertical direction.

3. The metal container washing apparatus according to claim 1 or 2,
   wherein the hydrogen peroxide generating agent is at least one selected from the group consisting of percarbonate, perborate, and persulfate.

4. The metal container washing apparatus according to claim 1 or 2, wherein the first electrode electrically comes into contact with and is connected to a metal portion of the metal container by being placed on the opening end of the metal container whose metal is exposed.

5. The metal container washing apparatus according to claim 1,
   wherein the first electrode has a flat disk-shape, and a first electrode hole is formed in a center portion of the disk-shaped first electrode;
   the second electrode has a rod-shape;
   a diameter of the first electrode hole is larger than a diameter of the rod-shaped second electrode; and
   an outer diameter of the flat disk-shaped first electrode is larger than a diameter of the opening end of the metal container.

6. The metal container washing apparatus according to claim 1, wherein the second electrode has a first section and a second section.

7. The metal container washing apparatus according to claim 1, wherein the base includes a lower inner peripheral edge, and wherein the first electrode is fitted between the step portion and the lower inner peripheral edge.

8. A metal container washing apparatus configured to wash a metal container for accommodating beverages, the metal container washing apparatus, comprising:
   a first electrode configured to apply a negative voltage to the metal container;
   a second electrode positioned and configured to apply a positive voltage to a washing solution in the metal container such that when the metal container contains a washing solution having a hydrogen peroxide generating agent and water, the hydrogen peroxide generating agent is dissolved to create hydroxyl radicals for washing an inner surface of the metal container;
   a power supply that applies a voltage between the first electrode and the second electrode, and an apparatus body including a base, the base configured to support the first electrode and the second electrode, and a lower surface of the base sized and shaped to be positioned across an opening end of the metal container;
   the apparatus body also includes a lid; and,
   wherein the lid includes a locking portion and the base includes a lock-receiving portion, such that the locking portion and the lock-receiving portion can fix the lid and base to each other.

9. The metal container washing apparatus according to claim 1, further comprising a metallic plate spring connected to a positive pole of the power supply in pressure contact with the second electrode.

10. The metal container washing apparatus according to claim 1, further comprising a packing to facilitate positioning of the second electrode.

11. The metal container washing apparatus according to claim 1, further comprising a switch that turns the power supply on or off.

12. The metal container washing apparatus according to claim 1, further comprising an auxiliary electrode.

* * * * *